United States Patent
Xing et al.

(10) Patent No.: US 7,568,021 B2
(45) Date of Patent: Jul. 28, 2009

(54) HYBRID MODE NETWORK STACK UNDER EFI/TIANO BASED BIOS IN MODULAR COMPUTING ENVIRONMENT

(75) Inventors: Bin Xing, Shanghai (CN); Yuanhao Sun, Shanghai (CN); Caidong Song, Shanghai (CN); Jianfeng Mei, Shanghai (CN); Feng Jin, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 709 days.

(21) Appl. No.: 10/849,866

(22) Filed: May 21, 2004

(65) Prior Publication Data

US 2006/0031462 A1    Feb. 9, 2006

(51) Int. Cl.
G06F 15/173    (2006.01)
(52) U.S. Cl. .................. 709/223; 709/224; 709/232; 709/233; 709/248
(58) Field of Classification Search ............... 709/223, 709/224, 232, 233, 248
See application file for complete search history.

(56) References Cited

U.S. PATENT DOCUMENTS

| | | | |
|---|---|---|---|
| 6,199,068 B1 * | 3/2001 | Carpenter | 707/100 |
| 6,230,010 B1 * | 5/2001 | Morris | 455/426.1 |
| 6,865,179 B1 * | 3/2005 | Cao | 370/352 |
| 6,947,427 B1 * | 9/2005 | Rokugo et al. | 370/395.5 |
| 6,950,419 B1 * | 9/2005 | Park et al. | 370/338 |
| 2002/0032692 A1 * | 3/2002 | Suzuki et al. | 707/200 |
| 2002/0045451 A1 * | 4/2002 | Hwang et al. | 455/442 |
| 2005/0228929 A1 * | 10/2005 | Penton et al. | 710/306 |

* cited by examiner

*Primary Examiner*—Liangche A Wang
(74) *Attorney, Agent, or Firm*—Ked & Associates, LLP

(57) ABSTRACT

A method of transmitting data through network stack choosing one of a synchronous and an asynchronous mode depending on requests of applications. The method may involve changing frequencies of a timer, for example, adjusting the frequency in the asynchronous Application Programming Interface (API) according to a load of network traffic and even stopping the timer for the synchronous API. In the asynchronous API, as heavier network traffic load is expected, the timer may increase its frequency. Accordingly, the timer decreases its frequency detecting the lighter network traffic and the remaining Central Processing Unit (CPU) cycles may be used to execute the foreground task, while the network stack still may respond to Internet Control Message Protocol (ICMP) and Address Resolution Protocol (ARP) requests. As the application tries to receive packets, for example, downloading a large volume of data, such as the kernel of an Operating System (OS), the network stack may even shut down the timer temporarily and switch to a synchronous mode to improve overall system performance. Here, the network stack may use a busy waiting signal to notify its status.

28 Claims, 6 Drawing Sheets

HYBRID MODE NETWORK STACK UNDER EFI/TIANO BASED BIOS IN MODULAR COMPUTING ENVIRONMENT

FIELD

The invention relates to network management and data transmission control.

BACKGROUND

Performing networking operations prior to booting up a computer is common. Preboot Execution Environment (PXE) is one technology that allows these operations to be performed remotely. For example, PXE allows an operating system (e.g., a root file system) loader or kernel to be downloaded from a Trivial File Transfer Protocol (TFTP) server, thereby making diskless workstations possible.

Network support on Basic Input/Output System (BIOS) may be implemented in synchronous mode, which means that the system can do nothing else when the application is trying to receive packets. During this process, the application only processes packets of interest and discards others. While synchronous mode simplifies the design of pre-booting firmware, it also has disadvantages. For example, the network stack is not responsive to any messages when the application stops polling or when the application does anything else other than polling in synchronous mode. Thus, it is not possible for the remote host to receive a reply after pinging a computer that finishes downloading an OS kernel using TFTP in a pre-boot state, because the PXE client (e.g., a TFTP client operating according to a Dynamic Host Configuration Protocol) terminates at that time and is not responsive to Internet Control Message Protocol (ICMP) packets.

Also, in blade server systems deployed in a modular computing environment as well as others, network stacks operating in synchronous mode may not be ideal. Remote configuration, remote diagnosis or remote monitoring may be preferred under these circumstances.

Another technology, known as EFI/Tiano, provides an interrupt-free pre-boot environment in which all interrupts are disabled except the timer interrupt, which is the only asynchronous event source. In this scheme, drivers are not allowed to use hardware interrupts. Instead, user polling is performed to communicate with devices. Also, each driver can register a timer event and poll the device state in an event notification function.

Because network traffic is unpredictable and because under EFI/Tiano polling is the only way for a driver to trace the state of the device, network stack software is often used to poll the Network Interface Card (NIC) at a high frequency to avoid loss of packets. However, polling wastes CPU cycles and therefore should be minimized to increase overall performance of the system.

DETAILED DESCRIPTION OF PREFERRED EMBODIMENTS

Figure 1:
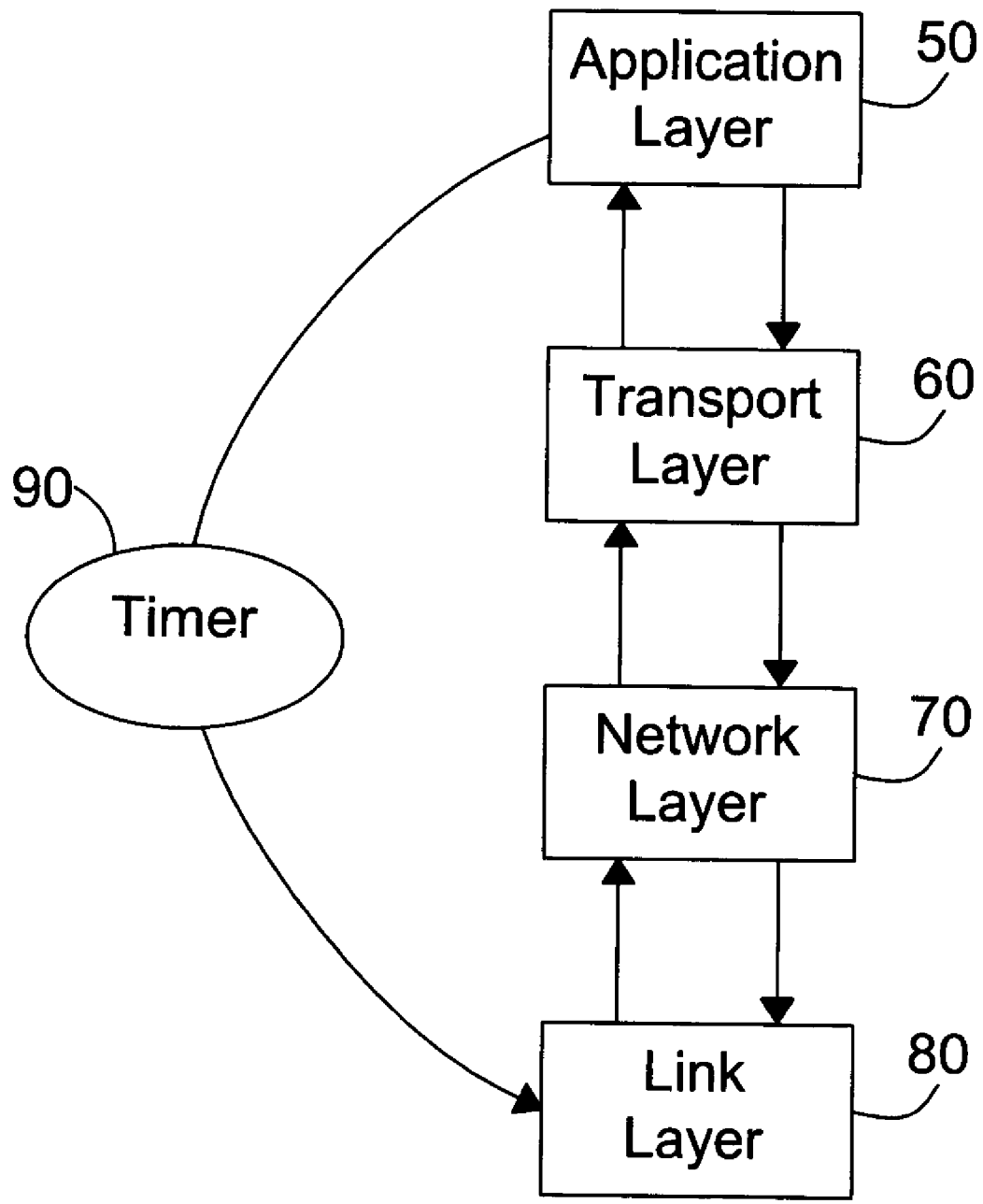
FIG. 1 is a block diagram of a hybrid mode network stack according to one embodiment of the present invention.

Referring to FIG. 1, a network stack according to one embodiment of the present invention includes an application layer 50, a transport layer 60, a network layer 70, and a link layer 80. The application layer 50 processes data packets received from the transport layer 60 and may be included in or associated with servers that operate, for example, based on one or more of the Hypertext Transfer Protocol (HTTP), Telnet, and Trivial File Transfer Protocol (TFTP). The application layer also selects between two modes of operation for the network stack, namely synchronous Application Programming Interface (API) mode and asynchronous API mode.

Figure 2:
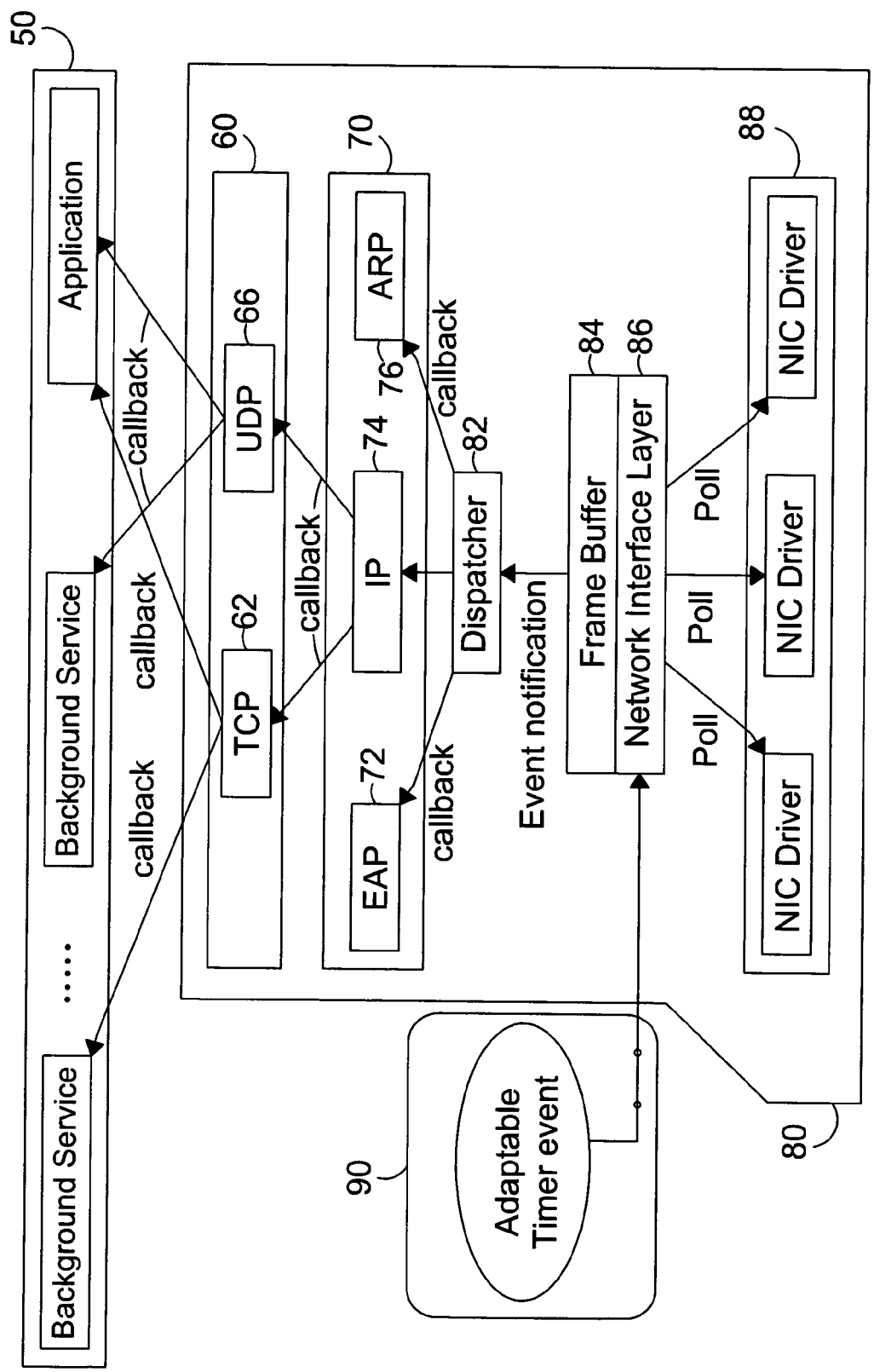
FIG. 2 shows an example of an asynchronous API architecture of the network stack of FIG. 1.
Figure 3:
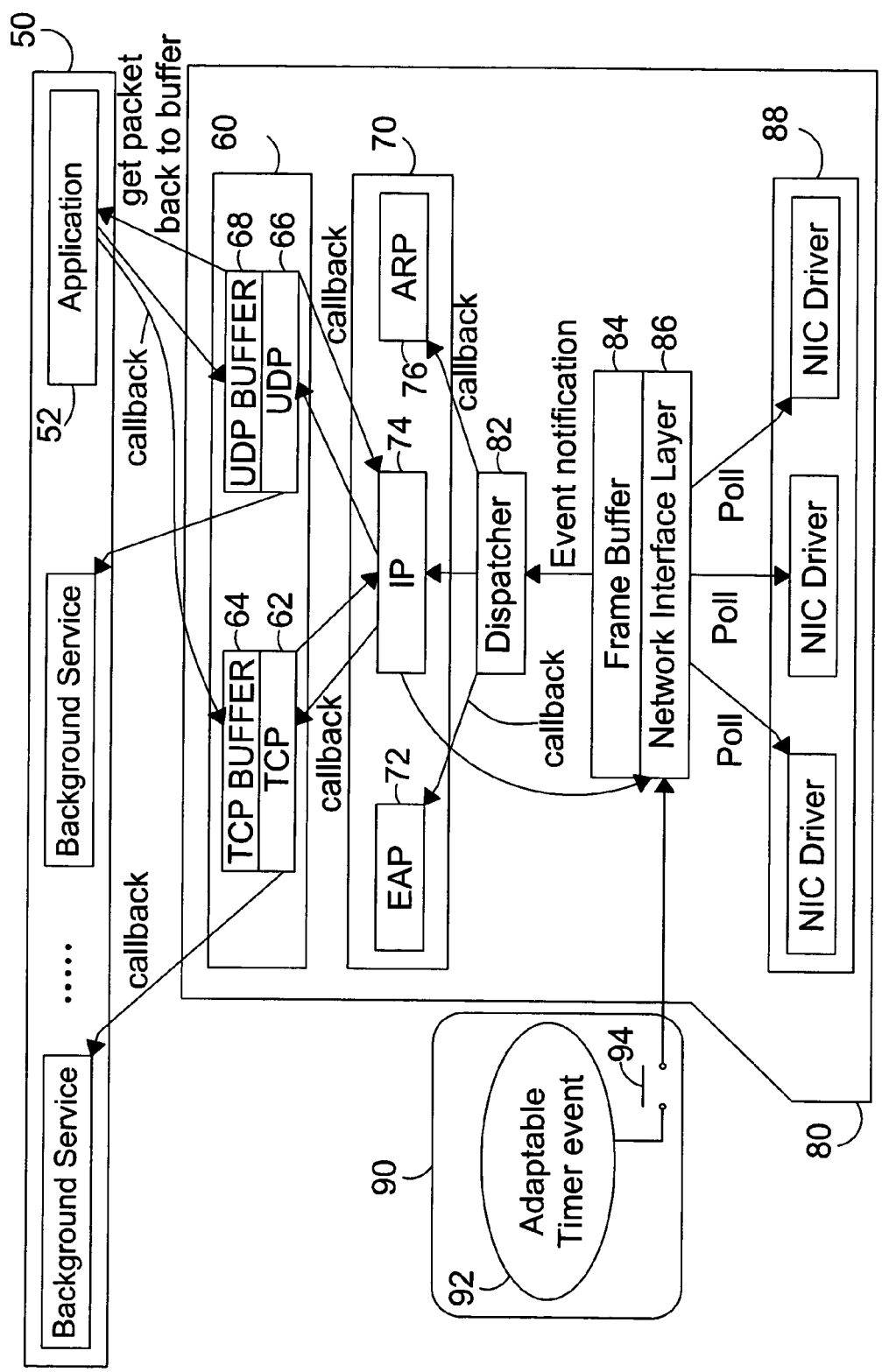
FIG. 3 shows an example of a synchronous API architecture of the network stack of FIG. 1.

The transport layer may collect data received from the network layer into buffers and then transmit the data to the application layer. To perform these operations, the transport layer may include a Transmission Control Protocol (TCP) unit 62 or a User Datagram Protocol (UDP) unit 66 as shown in FIG. 2. Each unit may contain a buffer, e.g., TCP unit 62 may include a TCP buffer 64 and UDP unit 66 may include a UDP buffer 68. (FIG. 3). These buffers may be used to cache data packets when, for example, the application layer may not be ready to receive the data packets. For instance, when the application is ready to receive data packets, the application may send a receive message to determine whether UDP buffer 68 is storing any pending packets. If the UDP and TCP buffers are empty, the transport layer may send a message to the network layer to notify the link layer to be polled. These operations will be described in greater detail below.

The network layer 70 forwards data from the link layer to the transport layer. In this embodiment, the network layer includes Internet Protocol (IP) unit 74, an address resolution protocol (ARP) unit 76, and an extensible authentication protocol (EAP) unit 72. The ARP unit maps a protocol address to a physical machine address recognized by the network. To perform this mapping, a table may be used to define a correlation between hardware addresses and corresponding protocol addresses. The EAP unit supports multiple authentication methods (token cards, public key authentication, etc.) for network communications. In operation, the network layer receives messages from the transport layer to poll the link layer, after which time the messages are then sent to the link layer and vice versa.

The link layer 80 includes one or more Network Interface Card (NIC) drivers 88, a frame buffer 84, a network interface layer 86, and a dispatcher 82. Each NIC driver receives messages that include one or more of EAP messages, ARP messages, and Internet Control Message Protocol (ICMP) messages from a network interface card. (ICMP is a message control and error-reporting protocol implemented using datagrams.) The network interface layer polls the NIC drivers 80 for these messages and stores them into the frame buffer, and then sends the received messages to the dispatcher 82 to be dispatched to the rest of the network stack.

The network stack operates in accordance with an adaptable timer 90, which drives the link layer and particularly the network interface layer 86 to poll the NIC drivers. The timer periodically sends an event notification to the link layer indicating that the timer period has expired. This period may be adjusted (e.g., by a control circuit not shown) according to traffic volume and/or other network parameters. For example, when no connections exist and a running task is not listening to any network traffic, the timer may be adjusted to a low frequency, e.g., longer period of time. When one or a small number of server programs are running in the background, the timer may be adjusted to a higher frequency due to expected heavier network traffic. During a time when a foreground application is downloading a large volume of data, the timer may be stopped.

In accordance with one or more embodiments of the present invention, the network stack changes its operating mode between synchronous and asynchronous modes according to requirements from the application layer. As shown in FIGS. 2 and 3, this change may be performed using a switch 94 which connects and disconnects the adaptable timer to the network interface layer of the 86 of the link layer in accordance with a timer event or period 92. When switch 94 is closed, the timer is enabled and the network stack operates in asynchronous mode.

More specifically, in accordance with at least one embodiment the foreground application switches the network stack into synchronous mode (by opening the timer switch) when it wants to send or receive a large volume of data, e.g., when the volume of data to be sent or received exceeds a predetermined threshold level. And whenever the application stops, the network stack preferably switches (by closure of switch 94) to asynchronous mode automatically if some background servers exist. The application preferably controls operation of switch by calling synchronous API functions. The switch might be, but is not necessarily, a physical circuit switch, although other switching arrangements are possible.

In asynchronous API mode, the timer controls polling of the NIC drivers based on the amount of network traffic. Asynchronous functions may be called by applications or background services that are expecting data packets. In this embodiment, what differentiates asynchronous functions from their synchronous counterparts is use of a callback function pointer. For example, an HTTP server, which would typically run as a background service, may provide the network stack with information indicating that it is waiting for packets on a TCP port. An asynchronous receive function ('arecv') may then be called and a callback function made available. The callback function may then be called whenever a packet is received though the TCP port.

In asynchronous API mode, processing is performed without the callback function. For example, when the callback parameter is NULL in a call to 'recv', the caller will not be notified at the time a packet is received. In this case, the 'recv' function may turn off the switch and control the underlying network interface layer to poll the NIC drivers frequently, and to then check whether any packets for the caller are pending in the TCP/UDP buffer. Since there may be no 'callback' function specified, the network stack may have no way to notify the destined caller. In this case, the stack may place the received packets in the TCP/UDP buffer.

Figure 4:
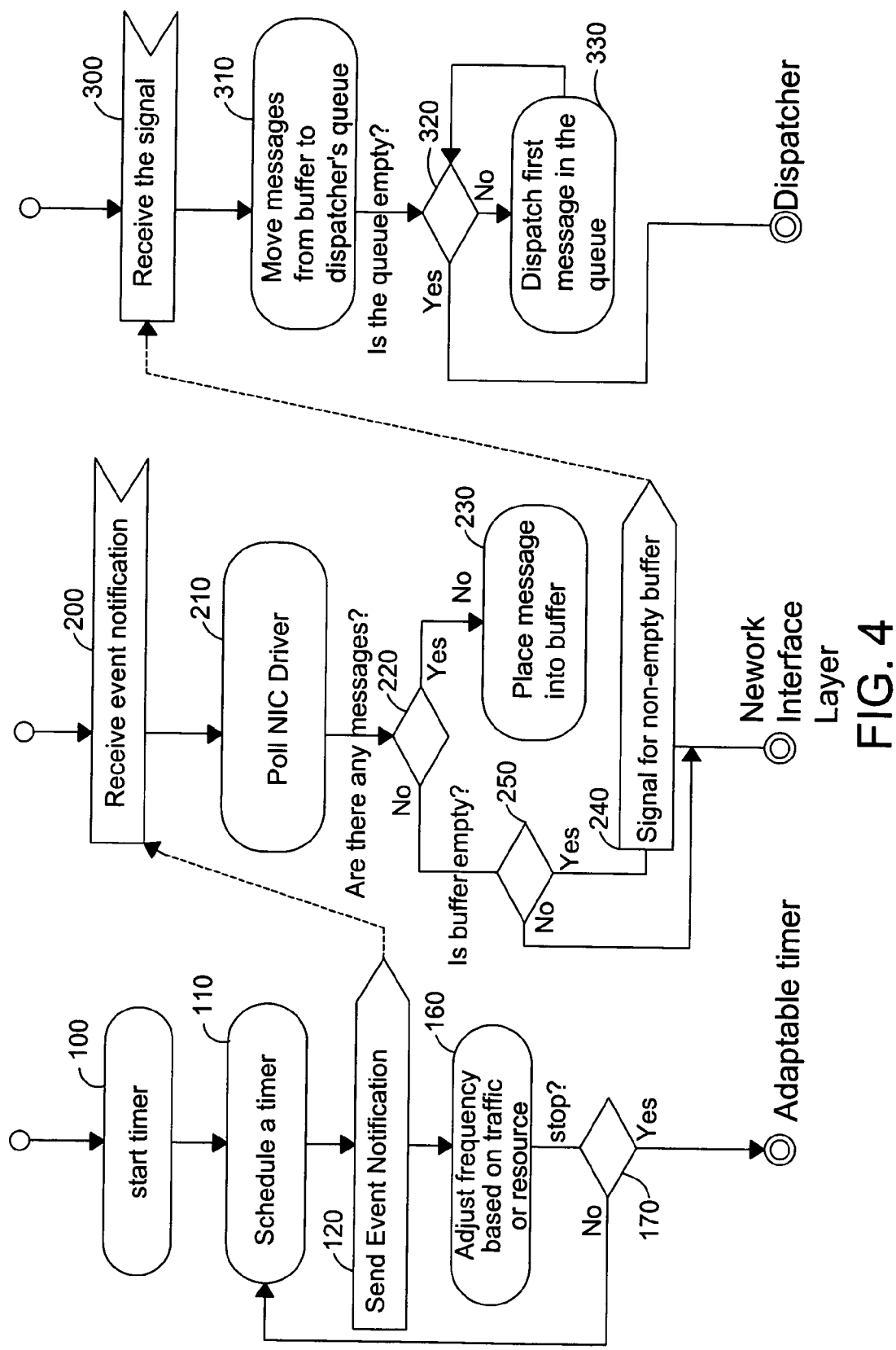
FIG. 4 is a flow chart showing asynchronous operations that may be performed by the network stack according to the foregoing embodiment of the present invention.

FIG. 4 shows functional blocks included in one embodiment of a method of the present invention for performing network management in asynchronous API mode. In this mode, the adaptable timer controls the frequency (timing) with which the NIC drivers are polled by the network layer interface based on the amount of traffic to be handled by the stack.

Initially, the timer is started, Block 100, and set with a schedule (e.g., period) for sending an event notification message to the network interface layer for polling the NIC drivers, Block 110. In accordance with this timer schedule, the event notification is sent. Block 120.

Once the network interface layer receives the event notification, Block 200, the NIC drivers are polled by the network interface layer, Block 210. A determination is then made as to whether any messages are received from the drivers. Block 220. If yes, the messages are stored in a queue of the frame buffer. Block 230. A signal is then generated indicating that the frame buffer has a not-empty status, Block 240. This signal, which may be generated by the frame buffer itself or a control circuit, is then sent to the dispatcher.

If no messages are received from the NIC drivers during this time, a determination is made as to whether the buffer is empty. Block 250. If the buffer is not empty, the non-empty status frame buffer signal is generated and sent to the dispatcher. Once this status signal is sent, the network interface layer remains idle until another signal is received from adaptable timer.

When the dispatcher receives a non-empty buffer status signal from the network interface layer, it may extract messages from the frame buffer and dispatch them. Block 300. This may involve copying the messages from the frame buffer into a queue of the dispatcher, Block 310, and then dispatching the messages one by one from the queue, Block 330. The copied messages may then be erased from the frame buffer. During this time, a check is performed to determine whether the queue is empty. Block 320. As long as messages exist in the queue, they are dispatched in seriatim. Once the queue is empty of messages, the dispatcher remains idle until another non-empty buffer status signal is received from network interface layer.

Once the event notification has been sent in Block 120, the frequency (e.g., period) of the adaptable timer may be adjusted based on network traffic volume in existence at that time and/or based on other factors including but not limited to available memory in the system and available computing resources from processors and the relative privilege to other tasks. Block 160. Taking traffic volume into consideration, if the amount of traffic has not changed, no adjustment may be made to the timer frequency. (This frequency refers to the reciprocal of the time period between two successive event signals sent to the network interface layer. In this embodiment, the timer frequency may be directly proportional to traffic volume, e.g., high frequencies are used for high traffic volume.)

After Block 160, a check may then be performed to determine whether operation of the timer should be stopped. Block 170. If not, process control returns to Block 110 where the timer schedule may be repeated or modified.

Preferably, all callback functions in FIGS. 2 and 3 are run in the context of the packet dispatcher and in a priority lower than the adaptable timer. Thus, when the timer sends an event notification, the dispatcher checks the status of the queue for any remaining messages. For example, when the dispatcher has completed dispatching all messages copied from the frame buffer before receiving the event notification from the timer, the dispatcher may extract new messages derived from polling and stored from the frame buffer.

On the other hand, if the dispatching process is in progress upon receiving an event notification, the dispatching process may continue. Accordingly, all newly received data may remain in the frame buffer until the current dispatching process is completed. Once the dispatcher queue is empty, the dispatcher may extract messages stored in the frame buffer and the dispatching process may start again.

Once data is dispatched from the link layer, it is sent to the network layer according to the protocol type in the frame headers. For example, during this time, ARP and EAP messages are dispatched to the ARP and EAP units respectively, and IP messages are passed on to the IP unit for proper routing. The routed data can be transmitted to the transport layer, and specifically to one of the UDP or TCP units for storage, and then sent to the application layer.

It is possible that the size and/or number of data packets or the amount of data in general to be sent to the application layer is too large to receive, at least to within a predetermined degree of accuracy. In this case the frequency of the timer may be raised proportionally to handle the data, or alternatively the timer may be disabled so that the application may switch to synchronous API mode. A busy waiting signal may be sent to the network stack in this case. By doing so, overall performance of the system may be improved while simultaneously enabling transmission of a large number of data packets.

In synchronous mode as shown in FIG. 3, synchronous functions do not need callback function pointers, in contrast to the asynchronous counterpart. The application can call these functions to busy wait for incoming data. These functions will internally stop the adapter timer temporary and send event notifications continuously to network interface layer to poll NIC drivers, until the interesting packets are placed into the UDP or TCP buffer or the preset busy waiting time out value has expired. Thereafter, the adaptable timer may be restarted again. In comparison, asynchronous functions will only start the timer once and let timer notify network interface layer to poll NIC drivers at an adaptable frequency.

Figure 5:
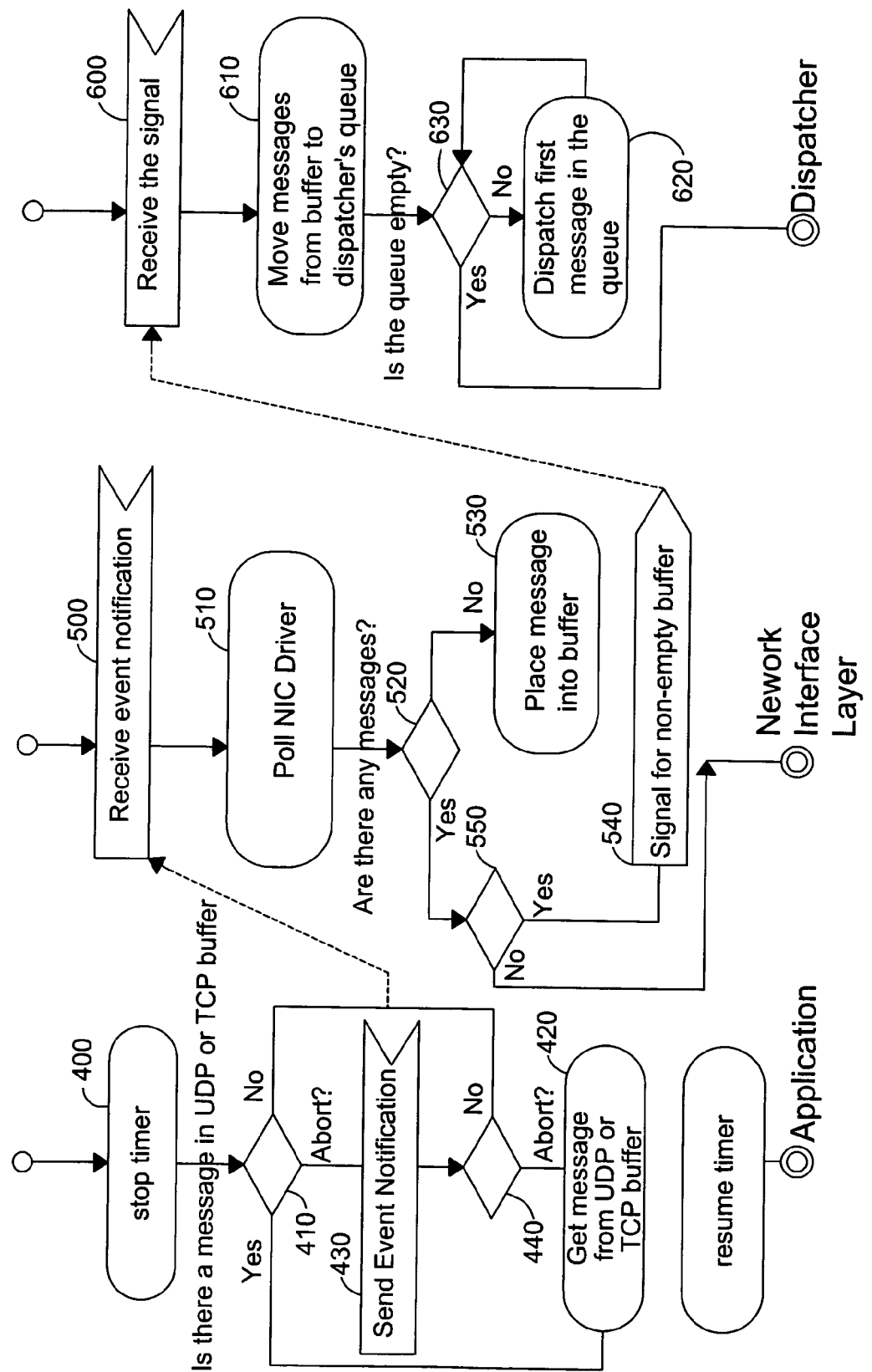
FIG. 5 is a flow chart showing synchronous operations that may be performed by the network stack according to the foregoing embodiment of the present invention.

Referring to FIG. 5, during synchronous mode the timer is stopped to allow the NIC drivers to be polled as frequently as possible or based on a predetermined polling frequency. Block 400. In performing this process, first a check is performed to determine whether any messages are stored in the UDP and TCP buffers. Block 410. If messages are stored in either buffer, then the application receives the messages stored in the buffer and the process is stopped. Block 420.

If no messages are stored in the UDP and TCP buffers, an event notification is sent to the network interface layer. Block 430. A decision is then made as to whether to abort the process of obtaining messages in the application layer. Block 440. This decision may be based, for example, on whether the waiting time out value has expired or not. If not, more event notifications will be sent to network interface layer.

Once the network interface layer receives the event notification, Block 500, the NIC drivers are polled, Block 510. If any of the drivers have messages, Block 520, the messages are stored in the frame buffer, Block 530, and a non-empty status signal is generated and sent to the dispatcher, Block 540. If the drivers do not have any messages, a check is performed to determine whether the frame buffer is otherwise empty. Block 550. If no, the non-empty frame buffer status signal is sent to the dispatcher. After that, the polling process will remain stopped until successive event notification is received from application.

Once the dispatcher receives the non-empty frame buffer status signal from the network interface layer, Block 600, the messages stored in the frame buffer are copied into the dispatcher queue, Block 610. The dispatcher then dispatches the messages from the queue to the network layer one at a time for routing. Block 620. Each iteration, a check is performed to determine whether the queue is empty. Block 630. If empty, the dispatcher operation is stopped until receiving another non-empty frame buffer status signal.

The data routed from the dispatcher is transmitted to the UDP or TCP unit of the transport layer. Since the application may still be unable to receive any more data at this time, data packets transmitted to the UDP or TCP units may be cached into the TCP and UDP buffers respectively. Once the application is ready to receive more data, it may call a receive function that checks the buffers to see whether any pending packets are stored in them. As soon as the application is able to receive data packets, the busy waiting signal may be withdrawn and switch 94 may be activated to switch the network stack back to the asynchronous API mode of operation. Also, the previously suspended adaptable timer may be resumed and its frequencies may set or adjusted based on traffic amount or any of the aforementioned conditions.

The adaptable timer thus provides for a way of simulating hardware interrupts in an interrupt-free environment. It may be adjusted to a very low frequency if no application or background services are running or listening on any port. This latter case refers, for example, to the case where a web server is listening on port 80, which means any incoming packets destined to local IP address and port 80 will be delivered to the web server. Different background services may listen on different port numbers. A very small portion of CPU time may be allocated to network stack at this time.

The application or user may determine whether to enable or disable the timer based on a predetermined usage model. For background services, the timer is preferably enabled. And for a foreground application, active polling is suitable and the timer can stopped before polling of network devices. In FIG. 5, the timer is actually stopped by a (foreground) application and resumed by the application later.

In addition, as an ICMP ping request is received, the network stack may still be able to give a response. When some background services and/or foreground applications are listening on a port, for example, such as when an HTTP service had been started, the timer frequency (period) may be adjusted to a higher frequency to avoid loss of an incoming connection request. After some TCP connections have been established, the timer may be able to be adjusted to an even higher frequency, for expecting heavy network traffics. As the foreground application polls the NIC drivers using synchronous APIs, it is equivalent to adjust the timer to extremely high frequency. And in that case, the timer is no longer needed, so we stop it.

The foregoing embodiments may be beneficial for use when more than one protocol stack may be desired in pre-boot environment. For example, customers may require the firmware to support both Ipv4 and Ipv6. The infrastructure must be flexible enough to accommodate more than one protocol stack simultaneously. The extensibility is achieved by laying a dispatcher between NIC drivers and a network layer. The responsibility of the dispatcher is to encapsulate polling details and dispatch each data link frame to the corresponding network layer protocol. Thus, more than one network layer protocol may be installed simultaneously. Other protocols such as EAP may also be dispatched to provide 802.1x capabilities.

The embodiments of the invention also scale well with an HT/MP system. Under an HT/MP system, a developer may choose to implement the adjustable timer using a dedicated application processor (AP) so as to free the burden of a bootstrap processor (BSP) to improve the overall performance. Generally speaking, the BSP initializes and configures hardware (e.g., one or more APs) when power is turned on. In most BIOS including EFI/Tiano, all tasks are running on BSP, while APs remain idle. In accordance with at least one embodiment, the present invention uses the computing resources of one or more APs to poll NICs, thereby freeing the burden on the BSP. Implementation of the enhancement requires improvement of existing Tiano even handling mechanism.

The embodiments of the invention may also be advantageous for use with future BIOS systems to support, for example, both client-side applications such as PXE as well as server-side services such as Hypertext Transfer Protocol (HTTP) server and Telnet Server. Through the network stack described herein, pre-boot environments are able to accommodate multiple server components simultaneously, while also allowing foreground applications to run in the same manner as legacy BIOS.

Also, while at least one embodiment of the present invention may be performed in a pre-boot environment, other applications or environments are also possible. For example, the embodiments described herein may be performed under any single-threaded interrupt-free circumstances.

Figure 6:
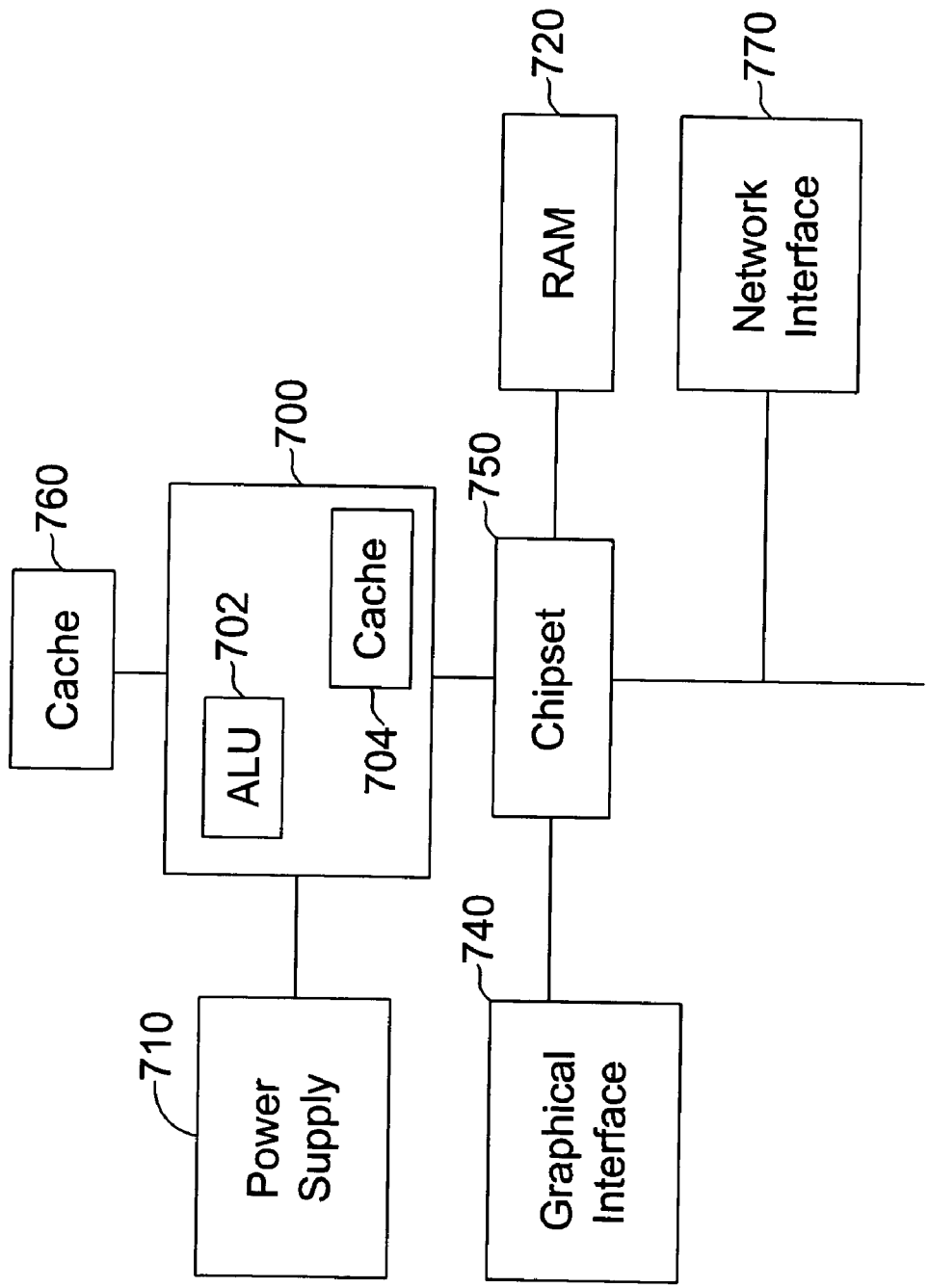
FIG. 6 is a diagram showing a processing system that may include or operate in accordance with any one of the embodiments of the present invention.

FIG. 6 shows a processing system which includes a processor 700, a power supply 710, and a memory 720 which, for example, may be a random-access memory. The processor includes an arithmetic logic unit 702 and an internal cache 704. The system also preferably includes a graphical interface 740, a chipset 750, a cache 760, and a network interface 770. The processor may be a microprocessor or any other type of processor. If the processor is a microprocessor, it may be included on a chip die with all or any combination of the remaining features, or one or more of the remaining features may be electrically coupled to the microprocessor die through known connections and interfaces. In FIG. 6, the embodiments of the present invention may be implemented in the network interface in enabling a network stack in an interrupt-free environment.

Moreover, the methods and procedures described herein may be implemented as software stored in any one of a variety of computer-readable mediums. These mediums include but are not limited to magnetic and optical media such as CDs, floppy disks, integrated circuit chips, flash and other types of memories as well as mediums. Also, in executing the software, it is noted that the functional blocks described herein and shown in the figures may be implemented by sections of code written in various programming languages.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method, comprising:
    detecting a network parameter; and
    changing an operating mode of a network stack between a synchronous application programming interface (API) mode and an asynchronous API mode based on the network parameter, wherein changing the operating mode of the stack includes changing the network stack to asynchronous API mode when the network parameter exceeds a predetermined threshold level, and
    wherein a first layer of the network stack controls timed polling of one or more network interface card (NIC) drivers for messages when in asynchronous API mode, said NIC drivers included in a second layer of the stack.

2. The method of claim 1, wherein the network parameter is indicative of network traffic volume.

3. The method of claim 1, wherein the first layer is an application layer.

4. The method of claim 1, wherein the second layer is a link layer.

5. The method of claim 1, wherein the first layer generates a signal to activate a timer which controls polling of the NIC drivers.

6. The method of claim 5, wherein when the timer expires, changing the network stack to synchronous API mode.

7. The method of claim 6, further comprising:
    adjusting a frequency of the timer to control polling based on the detected network parameter.

8. The method of claim 6, wherein the timer frequency is adjusted based on whether application or background services are running or listening on a port.

9. The method of claim 7, wherein the timer frequency is adjusted to be directly proportional to changes in the network parameter.

10. The method of claim 5, wherein the timer generates an event notification signal to the second layer, to cause a network interface sub-layer to poll the NIC drivers.

11. The method of claim 5, wherein the first layer operates the timer according to a schedule which simulates hardware interrupts in an interrupt-free environment.

12. The method of claim 1, wherein changing the operating mode of the stack includes: changing the network stack to synchronous API mode when the network parameter is below a predetermined threshold level.

13. The method of claim 12 further comprising:
    performing untimed polling of one or more network interface card (NIC) drivers for messages when in synchronous API mode.

14. A system, comprising:
    a network stack; and
    a controller circuit to change an operating mode of the network stack between a synchronous application programming interface (API) mode and an asynchronous API mode based on a detected network parameter, wherein the controller changes the operating mode of the network stack to synchronous API mode when the network parameter is below a predetermined threshold level, and wherein the controller performs untimed polling network interface card (NIC) drivers for messages when the stack is in synchronous API mode.

15. The system of claim 14, wherein the detected network parameter is network traffic volume.

16. The system of claim 14, wherein the controller changes the operating mode of the network stack to asynchronous API mode when the network parameter exceeds a predetermined threshold level.

17. A computer-readable medium storing a program comprising:
    a first code section to control detection of a network parameter; and
    a second code section to change an operating mode of a network stack between a synchronous application programming interface (API) mode and an asynchronous API mode based on the detected network parameter, wherein changing the operating mode of the stack includes changing the network stack to asynchronous API mode when the network parameter exceeds a predetermined threshold level, and
    wherein a first layer of the network stack controls timed polling of one or more network interface card (NIC)

drivers for messages when in asynchronous API mode, said NIC drivers included in a second layer of the stack.

18. The computer-readable medium of claim 17, wherein the network parameter indicates network traffic volume.

19. A system, comprising:
a network interface including a network stack; and
a manager including:
a) a detector to detect a network parameter; and
b) a controller to change an operating mode of the network stack between a synchronous application programming interface (API) mode and an asynchronous API mode based on the detected network parameter, wherein the controller includes a timer to control timed polled of one or more network interface card (NIC) drivers for messages when the stack is in asynchronous API mode.

20. The system of claim 19, wherein the detected network parameter indicates network traffic volume.

21. The system of claim 19, wherein the network interface and manager are included on a same chip die.

22. The system of claim 19, wherein a first layer of the network stack controls activation of the timer.

23. The system of claim 22, wherein the NIC drivers are included in a second layer of the network stack.

24. The system of claim 23, wherein the first layer is an application layer and the second layer is a link layer.

25. The system of claim 19, wherein the controller includes:
an adjuster to adjust a frequency of the timer to control polling based on the detected network parameter.

26. The system of claim 25, wherein the adjustor adjusts the timer frequency to be directly proportional to changes in the network parameter.

27. The system of claim 19, wherein the timer generates an event notification signal to cause a network interface sublayer of the stack to poll the NIC drivers.

28. The system of claim 22, wherein the controller changes the network stack to synchronous API mode when the timer expires.

* * * * *